July 2, 1929.  S. J. MONK  1,719,715
CHRISTMAS LIGHT
Filed June 19, 1928  2 Sheets-Sheet 1
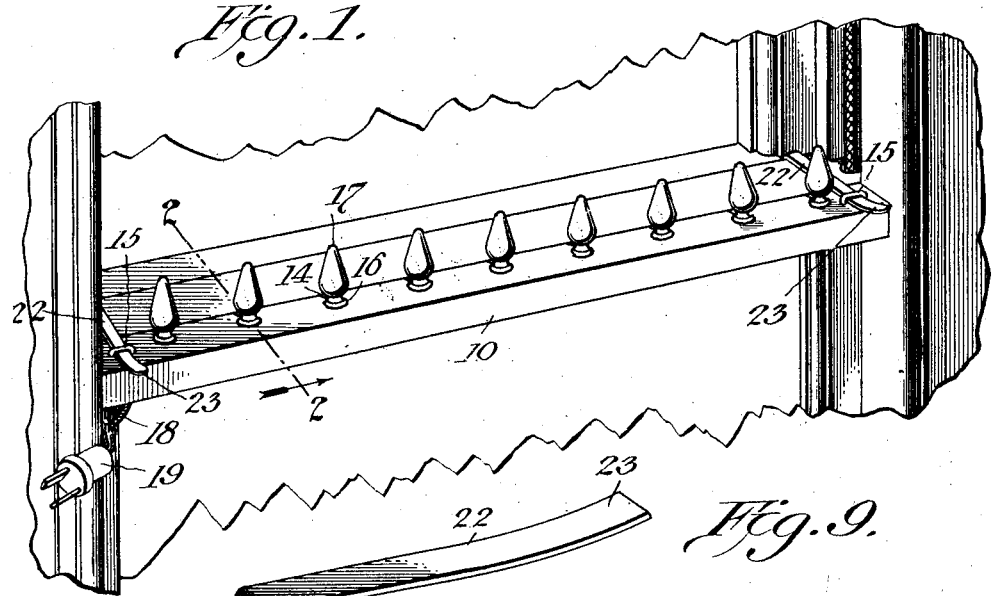
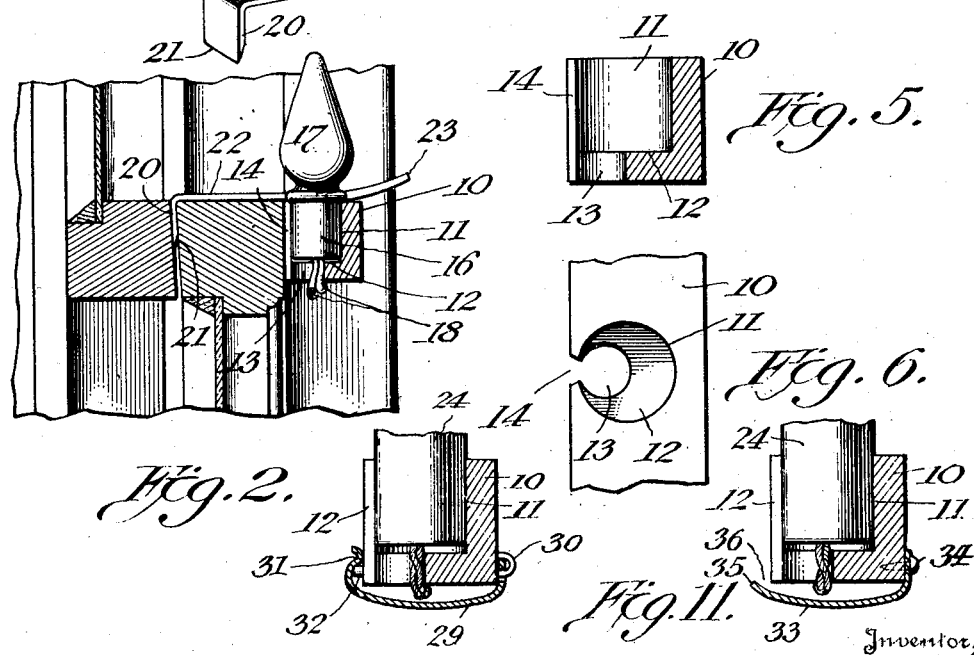
Inventor,
Sidney J. Monk.
By
Attorney July 2, 1929.  S. J. MONK  1,719,715
CHRISTMAS LIGHT
Filed June 19, 1928   2 Sheets-Sheet 2
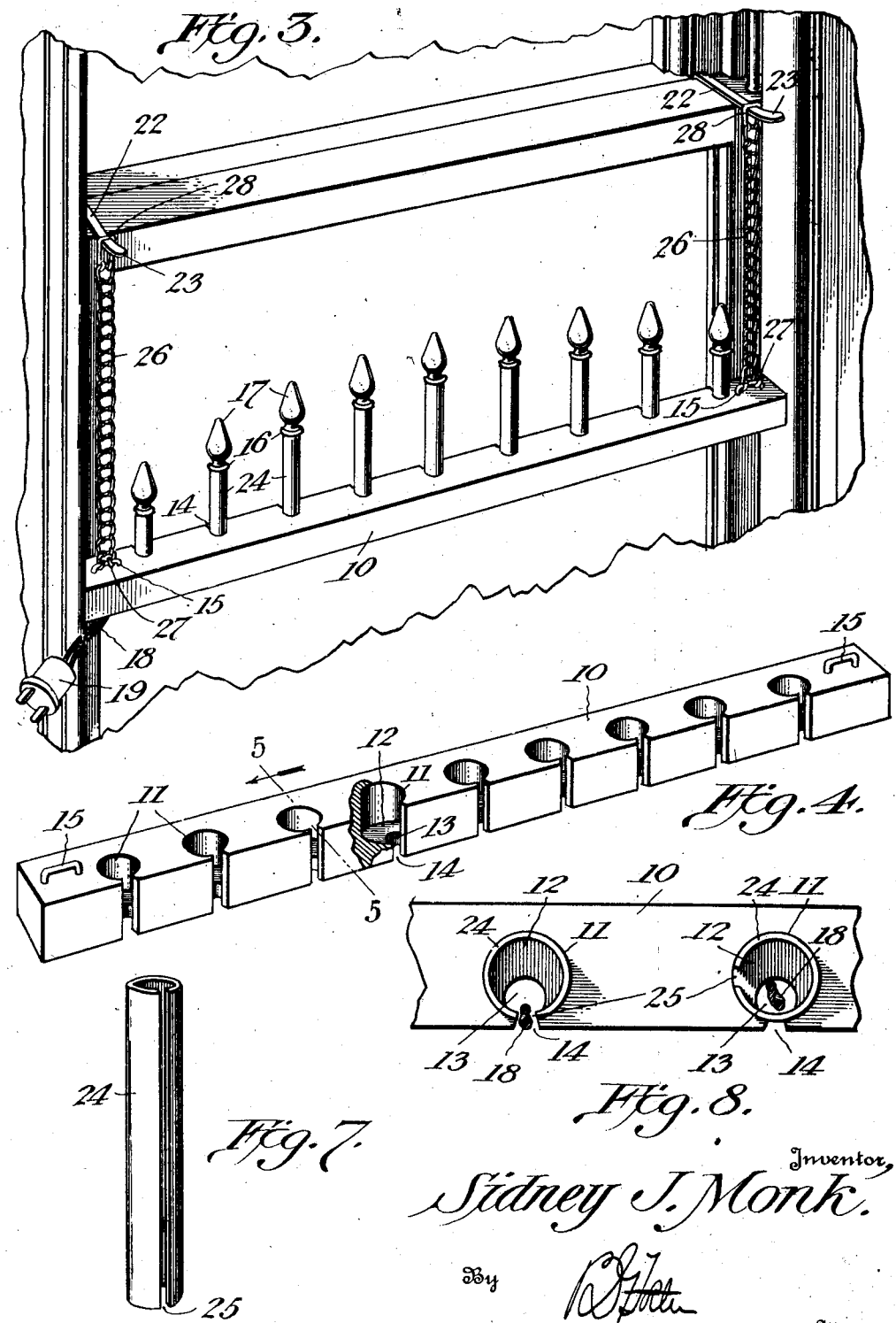

Patented July 2, 1929.

1,719,715

UNITED STATES PATENT OFFICE.

SIDNEY J. MONK, OF WASHINGTON, DISTRICT OF COLUMBIA, ASSIGNOR TO NORA MONK, OF WASHINGTON, DISTRICT OF COLUMBIA.

CHRISTMAS LIGHT.

Application filed June 19, 1928. Serial No. 286,595.

The present invention relates to means for artistically illuminating windows and the like at Christmas time or on other festive occasions, the object being to provide an exceedingly simple structure, involving electric lamp-holding means of a novel character that can constitute an article of manufacture in itself, and with which can be used standard electrical equipment, such as that employed for Christmas tree illumination.

In the accompanying drawings:

Figure 1 is a perspective view of an embodiment of the invention of a relatively simple character, showing the same in place in a window.

Figure 2 is a vertical sectional view on the line 2—2 of Figure 1.

Figure 3 is a perspective view of a more ornate embodiment of the invention.

Figure 4 is a perspective view of the supporting bar alone.

Figure 5 is a cross sectional view through the same on the line 5—5 of Figure 4.

Figure 6 is a plan view of a portion of the bar.

Figure 7 is a perspective view of one of the tubular fixtures shown in Figure 3.

Figure 8 is a plan view of a portion of the structure shown in Figure 3, showing two of the fixtures in different positions.

Figure 9 is a perspective view of one of the supporting hooks.

Figures 10 and 11 are cross sectional views showing different forms of devices for concealing the feed wires.

In both embodiments, a supporting bar is employed, and as this bar is the same in all cases, the same reference numerals have been applied to it in the two forms shown in Figures 1 and 3. This bar is designated generally by the reference numeral 10, and may be of wood or other suitable material. It is provided with a plurality of sockets 11 that open through its top, said sockets terminating short of the lower side of the bar, and thus having bottoms 12. Through these bottoms are openings 13 of less diameter than the diameter of the sockets, and preferably eccentrically disposed as shown in Figures 6 and 8. One side of the bar is provided with a series of slots 14 that open into the sockets and into the bottom openings. The ends of the bar are provided with upstanding keeper loops 15 that may be in the form of staples driven into the bar.

Now referring to the form of structure shown in Figures 1 and 2, the sockets 11 have detachably fitted into them, the socket elements 16 of small electric lamps, preferably such as are used for Christmas tree illumination, the lamps being shown at 17. The supply wires 18 for the lamps pass through the bottom openings 13, and are connected to a suitable plug 19.

For the purpose of supporting the bar in a window, hooks are employed, one of which is shown in detail in Figure 9. Each of these hooks consists of a downturned bill 20 having a sharpened lower end 21, and a horizontal shank 22, the free end of which is upturned as illustrated at 23. These hooks are adapted to fit in the joint between the meeting rails of the window-sash, as clearly shown in Figure 2, and the shanks are long enough so that the upturned portions 23 project beyond the inner sash. The projecting portions are received by the keeper loops 15 and the bar is thus suspended at the level of the sash rail. Moreover the downward pressure of the bar on the shank of the hook tends to cause the bills to hold the same in place.

With this structure, it will be evident that the supporting bar 10 may be made and sold as an article of manufacture, and may be fitted up with the usual set of lamps, such as those employed for Christmas tree illumination.

It is only necessary in using them therefore to enter the supply wires 18 through the slots 14, and enter the lamp socket elements 16 in the sockets 11 of the bar, all as illustrated in Figures 1 and 2. The lamps projecting above the sash rail thus give a pleasing illumination at the window and the desirable effect can of course be increased by employing lamps of different colors.

A more ornate and attractive modification is shown in Figures 3, 7 and 8. In this case the sockets 11 of the bar 10 receive tubular fixtures 24 that may be of metal or other suitable material, and desirably colored. They represent candles. These fixtures are longitudinally slotted, as illustrated at 25 and are rotatable in the sockets 11 so that their slots 25 can be brought into or moved out of alinement with the slots 14 of the bar. Into the upper ends of the fixtures 24 are fitted the lamp socket elements 16. The fixtures 24 may be of the same or of different lengths, as illustrated in Figure 3.

In fitting up this form of structure, the electric supply wires 18 are first passed through the slots 25 of the fixtures 24 and the lamp socket elements 16 are then engaged in the upper ends of said fixtures. The fixtures are then fitted into the sockets 11 of the bar with their slots 25 alined with the slots 14, whereupon the supply wires are passed through the latter slots as illustrated in the left hand mounting of Figure 8. The fixtures are then turned to carry the slots 25 out of alinement with the slots 14, whereupon the wires are effectively retained in place as illustrated at the right hand mounting in Figure 8.

The bar as thus fitted up may have its keepers 15 engaged directly with the shanks of the slots as in Figure 1, but it may be desired to suspend the illuminating device at a point below the meeting rails, in which case, chains 26 or other suitable hangers may be employed, having lower terminal hooks 27 that engage the keepers 15 and upper loops 28 engaging the shanks 23 of the supporting hooks. This provides moreover an adjustable support because any of the links of the chain can be engaged with the shanks of the supporting hooks.

If desired the feed wires may be concealed by any suitable means. Thus in Figure 10 a plate 29 is hinged at 30 to one side of the bar 10 and extends around the bottom of the same, its other end being inturned as shown at 31 and engaging over one or more heads 32 fixed to the other side of the bar 10. This plate is spaced from the bottom of the bar sufficiently to receive the usual feed wires.

In Figure 11 a similar covering plate 33 is fixed to one side of the bar by fasteners 34 and its opposite edge 35 is suitably spaced from the opposite portion of the bar, leaving a throat 36 through which the wires can be passed.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. An illuminating means for windows comprising a rigid bar having means for holding electric lamp fixtures, longitudinally disposed keeper loops carried by the end portions of the bar, and hanger hooks having downturned bills that engage between the meeting rails of a window, said hooks having shanks that rest upon the sash transversely thereof and project beyond the sash and are received by the keeper loops.

2. An illuminating means for windows comprising a bar having bottomed sockets for electric light fixtures and openings through the bottoms of the sockets and of less diameter than the same for the reception of the supply wires, said bar further having slots opening through the sides of the bar to the sockets and the bottom openings to permit the entrance and disengagement of the supply wires for such fixtures, and means for supporting the bar.

3. An illuminating means for windows and the like comprising a bar having sockets opening through its top and extending but part way through the same forming a bottom, wire receiving openings through the bottom and of less diameter than the sockets, said openings being nearer one side of the bar than the other, and slots opening through the sides of the bar that are nearer to the openings, said slots extending to the sockets and the openings.

4. An illuminating means for windows comprising a rigid bar having means for holding electric lamp fixtures, keeper loops carried by the end portions of the bar, and hanger hooks having downturned bills that engage between the meeting rails of a window, said hooks having shanks that extend across the sash and have upturned ends adapted to detachably engage the keeper loops.

In testimony whereof, I affix my signature.

SIDNEY J. MONK.